US007213319B2

(12) United States Patent
Silva, Jr. et al.

(10) Patent No.: US 7,213,319 B2
(45) Date of Patent: May 8, 2007

(54) METHOD OF INSTALLING A DRY SPRINKLER INSTALLATION

(75) Inventors: Manuel R. Silva, Jr., Cranston, RI (US); Robert M. Cordell, Worcester, MA (US); David Stevens, Riverview, FL (US)

(73) Assignee: Tyco Fire Products LP, Cranston, RI (US)

( * ) Notice: Subject to any disclaimer, the term of this patent is extended or adjusted under 35 U.S.C. 154(b) by 292 days.

(21) Appl. No.: 10/998,706

(22) Filed: Nov. 29, 2004

(65) Prior Publication Data

US 2006/0113094 A1 Jun. 1, 2006

(51) Int. Cl.
*A62C 35/00* (2006.01)
*B23P 11/00* (2006.01)

(52) U.S. Cl. ....................... 29/428; 29/525.01; 169/17; 169/51

(58) Field of Classification Search ............. 29/890.14, 29/890.143, 428, 525.01, 525.13; 169/16, 169/17, 5, 51; 239/397.5, 288, 288.3, 288.5, 239/113, 114, 115
See application file for complete search history.

(56) References Cited

U.S. PATENT DOCUMENTS 4,699,217 A * 10/1987 McLennan et al. ........... 169/37
4,706,759 A * 11/1987 Grasseschi ................... 169/51

FOREIGN PATENT DOCUMENTS

JP 06063175 A * 3/1994

* cited by examiner

*Primary Examiner*—Jermie E. Cozart
(74) *Attorney, Agent, or Firm*—Montgomery Smith; Christopher G. Trainor

(57) ABSTRACT

A dry sprinkler installation and sealing device for a cold environment is disclosed. The dry sprinkler installation includes a supply conduit having a first end adapted to communicate with a fire retardant fluid source and a second end supporting a sprinkler head. The supply conduit is dimensioned to extend through an opening in a wall of a cold environment, e.g., a freezer ceiling. A flexible sealing device is positioned about the supply conduit adjacent an exterior surface of the cold environment. A first end of the sealing device is secured about the supply conduit and a second end of the sealing device is secured to an exterior surface of the cold environment. The flexible sealing device allows for radial and axial adjustments to the supply conduit and sprinkler head without compromising the integrity of the sealing device.

11 Claims, 4 Drawing Sheets

METHOD OF INSTALLING A DRY SPRINKLER INSTALLATION

BACKGROUND

1. Technical Field

The present disclosure relates to dry sprinkler installations and, more particularly, to a sealing device for use with a dry sprinkler freezer installation.

2. Background to Related Art

Dry sprinkler installations for use in fire protection systems are well known. Typically, dry sprinkler installations include a fluid supply conduit having a first end supporting a sprinkler head and a second end communicating with a fluid main. The sprinkler head includes a thermally responsive device which when activated allows water, nitrogen or other fire retarding agent to flow through the fluid supply conduit and exit the sprinkler head.

The use of dry sprinkler installations in cold environments such as freezers is well known. Typically, in a dry sprinkler installation for a cold environment, the sprinkler supply conduit extends through a hole or opening in the ceiling of the cold environment and an annulus between the supply conduit and the inner diameter of the opening is filled with a spray-foam type of insulation. Thereafter, when the spray-foam insulation hardens or solidifies, it becomes rigid and brittle and does not allow for any movement of the supply conduit or sprinkler head. As a result, any adjustments to the supply conduit or sprinkler head can produce cracks in the spray-foam insulation. If the spray-foam insulation does crack, the thermal insulation properties of the spray-foam insulation are compromised and warm air is able to travel into the cold environment. This can be problematic to the dry sprinkler installation. More specifically, because warm air outside the cold environment generally has a higher relative humidity than the cold air within the cold environment, the cold temperature in the cold environment causes the moisture in the warm air to condense. As the moisture condenses, water droplets form and can accumulate around and on the sprinkler head. As these droplets freeze, ice may accumulate on the sprinkler head. A significant accumulation of ice on the sprinkler head may impair the operability of the sprinkler head such as to delay or prevent operation of the sprinkler head in the event of a fire or effect premature operation of the sprinkler head in absence of a fire.

Accordingly, a continuing need exists in the sprinkler installation art for an apparatus and a method for installing a dry sprinkler installation in a cold environment which provides adequate sealing yet allows for adjustments and/or maintenance to be performed on the sprinkler head and/or supply conduit.

SUMMARY

In accordance with the present disclosure, a dry sprinkler installation for a cold environment is provided which includes a supply conduit having a first end adapted to communicate with a fluid main and a second end supporting a sprinkler head and a sealing device for sealing the annulus defined between the supply conduit and the inner diameter of an opening in a support structure, e.g., a cold environment or freezer. The annular sealing device includes a body which defines a throughbore having a first end dimensioned to sealingly engage the outer circumference of the supply conduit and a second end configured to engage an exterior surface of the support structure. In one preferred embodiment, the second end of the annular sealing device includes a radial flange which is secured to the exterior surface of the support structure with an adhesive, e.g., an ethyl cyanoacrylate adhesive. In another preferred embodiment, the first end of the annular sealing device is secured about the supply conduit using flexible ties, e.g., nylon ties.

In one embodiment, the body of the annular sealing device is formed from a flexible material which permits a limited degree of axial and radial movement of the supply conduit and/or sprinkler head in relation thereto without damaging the annular seal. The flexible material is preferably a rubber, e.g., EPDM rubber, although the use of other known flexible materials is envisioned.

A method for installing a dry sprinkler system adjacent a cold environment, e.g., a freezer, is also provided. The method includes the steps of 1) providing a dry sprinkler including a supply conduit having a first end adapted to communicate with a fluid supply main and a second end supporting a sprinkler head; 2) positioning the supply conduit through an opening formed in a wall of the cold environment such that the sprinkler head is positioned within the cold environment; 3) positioning a flexible annular sealing device about the supply conduit such that the flexible annular sealing device is positioned externally of the cold environment; 4) securing the first end of the annular sealing device about the supply conduit; and 5) securing the second end of the annular sealing device to an exterior surface of the cold environment. In a preferred embodiment, the first end of the annular sealing device is secured to the supply conduit using at least one tie, e.g., a nylon tie, and the second end of the annular sealing device is secured to the exterior surface of the cold environment using an adhesive, e.g., an ethyl cyanoacrylate adhesive.

BRIEF DESCRIPTION OF THE DRAWINGS

Various preferred embodiments of the presently disclosed dry sprinkler installation and sealing device are described herein with reference to the drawings, wherein.

DETAILED DESCRIPTION OF PREFERRED EMBODIMENTS

Figure 1:
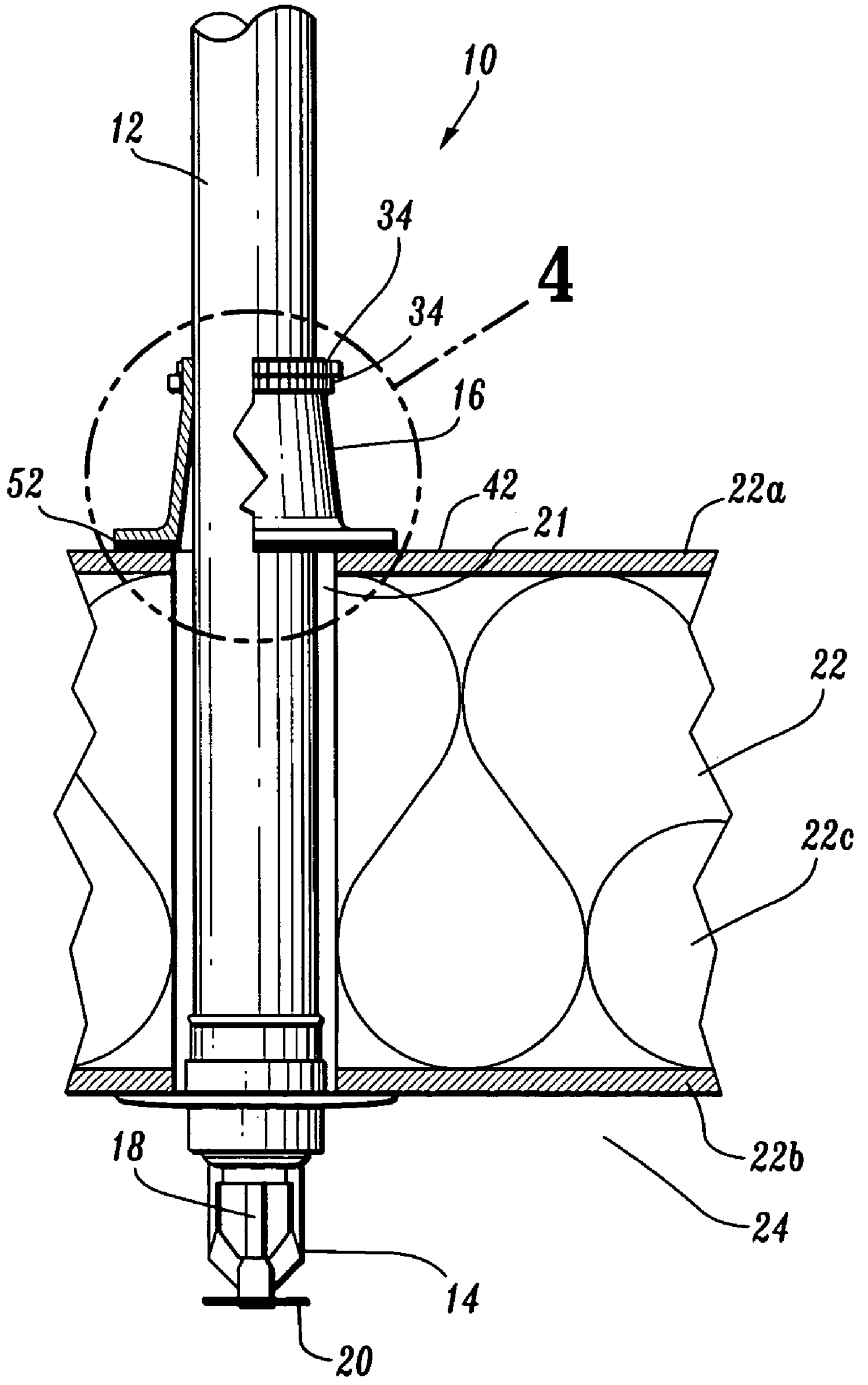
FIG. 1 is a side cross-sectional view of one preferred embodiment of the presently disclosed dry sprinkler installation and sealing device.

Preferred embodiments of the presently disclosed dry sprinkler installation and sealing device are disclosed herein with reference to the drawings, in which like reference numerals designate identical or corresponding elements in each of the several views.

Referring to FIG. 1, the presently disclosed dry sprinkler installation and sealing device is shown generally as 10. Briefly, dry sprinkler installation 10 includes a supply conduit or sprinkler casing 12, a sprinkler head 14, and a sealing device 16. Sprinkler head 14 is known in the art and, typically, includes a thermally responsive device 18 and a fluid deflector 20. In the event of a fire, thermally responsive device 18 reacts to heat generated by the fire to allow fluid to flow through supply conduit 12 and into deflector 20 where the fluid is dispersed outwardly to extinguish the fire. Although a fluid commonly used in such dry sprinkler installations is water, other fire retardant fluids including nitrogen and halogen, may also be used in dry sprinkler installation 10.

As illustrated in FIG. 1, supply conduit 12 is positioned to extend through an opening 21 in a wall 22, e.g., the ceiling, of a cold environment 24. Cold environment 24 may be a freezer or the like. Typically, in a freezer, wall 22 will include an outer wall 22*a*, an inner wall 22*b* and an insulated central portion 22*c* positioned between the inner and outer walls 22*a* and 22*b*. Supply conduit 12 is positioned through hole 21 such that sprinkler head 14 is positioned within cold environment 24 and sealing device 16 is positioned about supply conduit 12 adjacent outer wall 22*a* of cold environment 24. As will be described in detail below, sealing device 16 provides an airtight seal between supply conduit 12 and wall 22 of cold environment 24.

Figure 2:
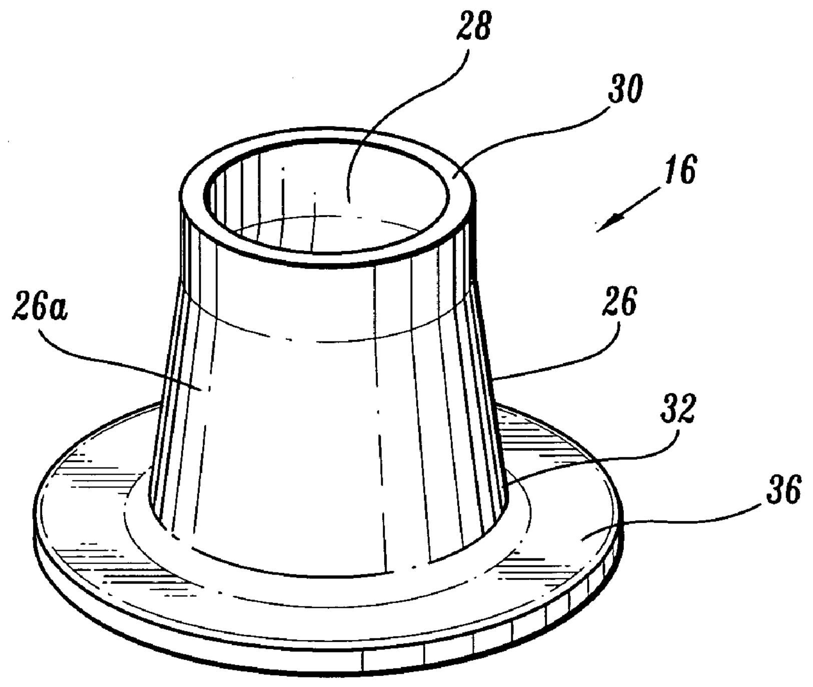
FIG. 2 is a perspective view of the sealing device shown in FIG. 1.
Figure 3:
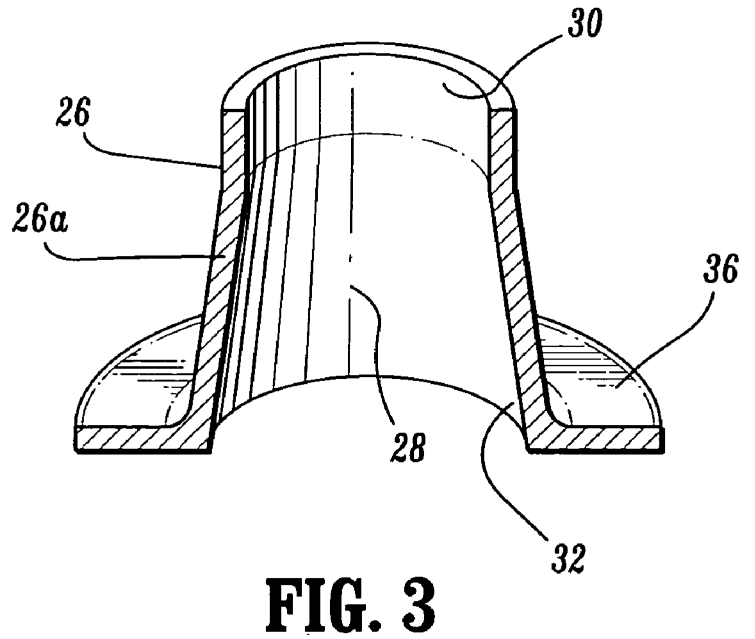
FIG. 3 is a cross-sectional view of the sealing device shown in FIG. 2.
Figure 4:
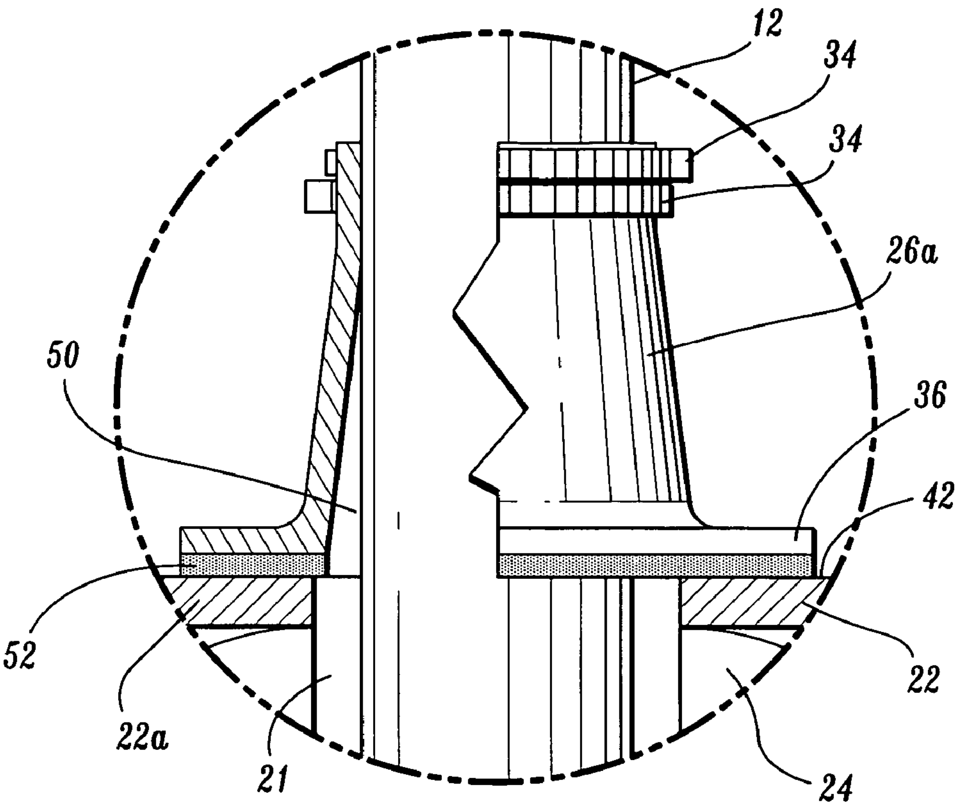
FIG. 4 is an enlarged view of the indicated area of detail shown in FIG. 1.

Referring also to FIGS. 2–4, sealing device 16 includes a body 26 defining a throughbore 28 having a first end 30 and a second end 32. Body 26 is formed from a flexible material which allows for radial and axial adjustments to sprinkler head 14 and supply conduit 12 without damaging sealing device 16. Preferably, sealing device 16 is molded from rubber, e.g., an ethylene propylene diene terpolymer rubber (EPDM) although other flexible materials including neoprene, natural rubbers, and polyisoprenes may be used to form sealing device 16. Preferably, first end 30 of body 26 is dimensioned to fit snugly about supply conduit 12. In one embodiment, at least one flexible tie 34, e.g., a nylon tie, is provided to sealingly secure first end 30 of body 26 about supply conduit 12. Alternately, other securement devices may be used to secure first end 30 about supply conduit 12 including hose clamps, adhesives, etc.

Figure 5:
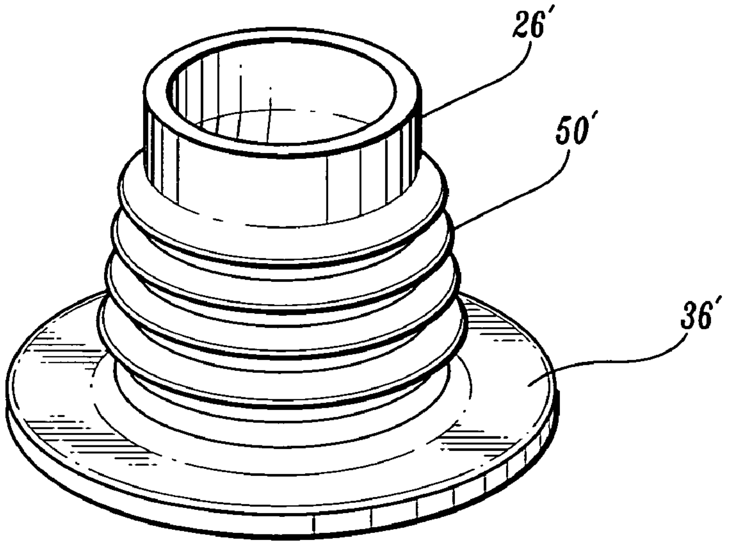
FIG. 5 is a side perspective view of another preferred embodiment of the presently disclosed sealing device.

Second end 32 of body 26 includes a radial flange 36. Preferably, body 26 of sealing device 16 is substantially conical in shape and allows for radial and axial movement of supply conduit 12 and sprinkler head 14 without compromising the integrity of the seal. The conical portion 26*a* of body 26 also defines a chamber 50 (FIG. 4) with supply conduit 12 for capturing stagnant air. Stagnant air is known for having excellent thermal insulation properties. Alternately, it is envisioned that body 26 may have other configurations. For example, as shown in FIG. 5, body 26' may have a bellows portion 50' which also facilitates radial and axial movement of the supply conduit and sprinkler head.

Referring specifically to FIGS. 1 and 4, sealing device 16 is positioned about supply conduit 12 such that radial flange 36 abuts an exterior surface 42 of outer wall 22*a* of cold environment 24. In a preferred embodiment, an adhesive 52, such as an ethyl cyanoacrylate adhesive, is provided to secure radial flange 36 to exterior surface 42 of cold environment 24. One preferred adhesive is Saf-T-Loc® Instant Bonder IB 1500 which is available from Saf-T-Loc International Corporation, Lombard, Ill., USA. Alternately, other adhesives and attachment devices may be used to secure flange 36 to exterior surface 42 of cold environment 24. During installation of dry sprinkler installation 10 in a cold environment, such as a freezer, opening 21 is formed in ceiling or wall 22 of the freezer. Opening 21 is generally about 1.75 inches in diameter although the size of the opening will vary with the outer diameter of the supply conduit 12. Next, the supply conduit 12 is inserted up through opening 21 and sealing device 16 is slid over supply conduit 12 exteriorly of the freezer and positioned adjacent the exterior surface 42 of outer wall 22*a* of the freezer ceiling. The contact surface of the exterior wall is wiped clean with a damp cloth and the adhesive is applied to the contact surface (or the radial flange). The radial flange 36 is now pressed onto the adhesive and the contact surface to secure sealing device 16 to exterior surface 42 of the freezer. Next, two nylon ties or the like are used to secure first end 30 of sealing device 16 to supply conduit 12.

Figure 6:
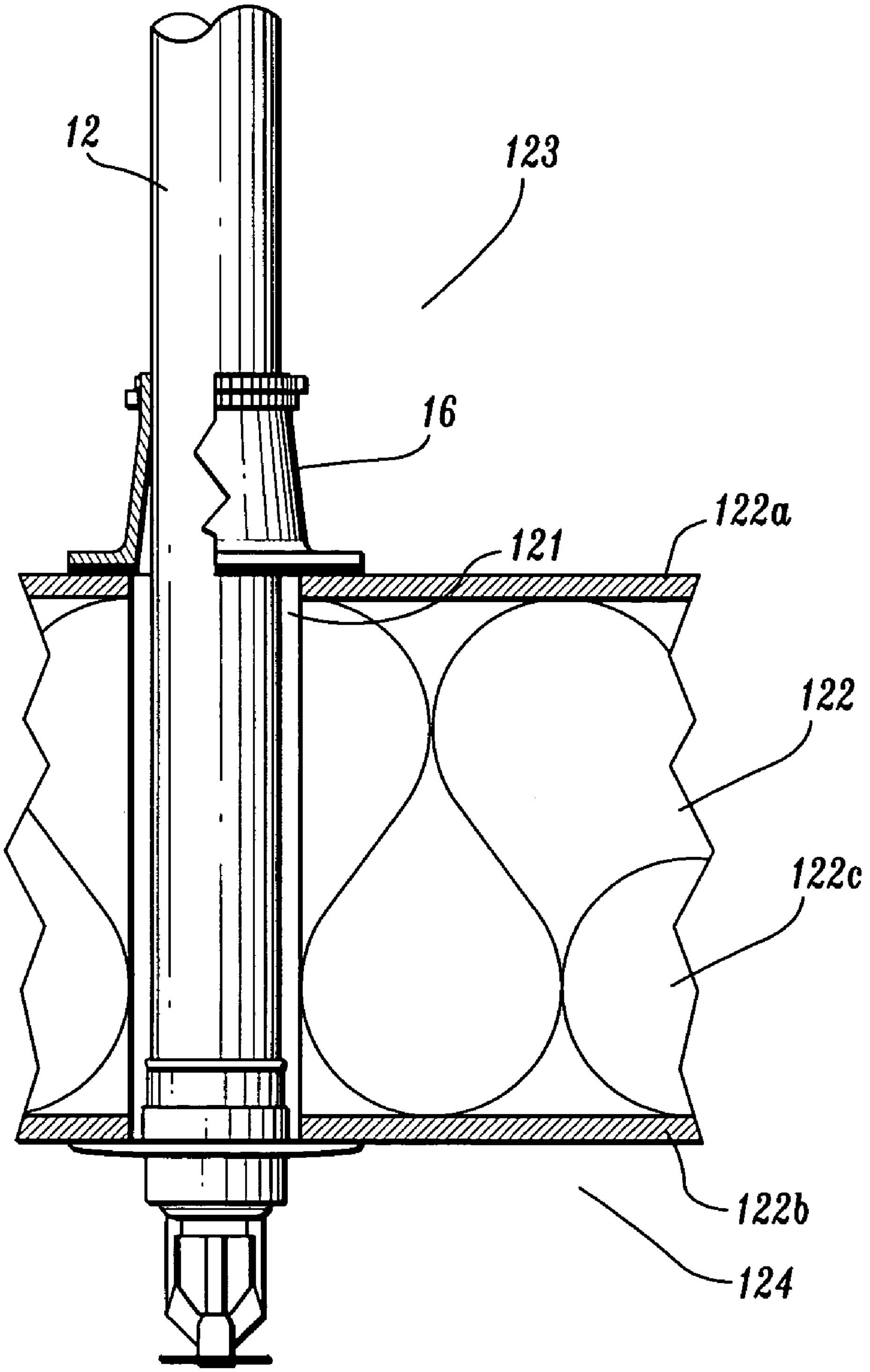
FIG. 6 is a side cross-sectional view of an alternative embodiment of the presently disclosed dry sprinkler installation and sealing device.

In an alternative embodiment illustrated in FIG. 6, supply conduit 12 is positioned to extend through an opening 121 in a wall 122, e.g., the ceiling, of a heated room 124. The cold environment in this embodiment may be, for example, an unheated attic space 123 above the heated room. Typically, wall 122 will include an outer wall 122*a*, an inner wall 122*b* and an insulated central portion 122*c* positioned between the inner and outer walls 122*a* and 122*b*. Supply conduit 12 is positioned through hole 121 such that sprinkler head 14 is positioned within heated room 124 and sealing device 16 is positioned about supply conduit 12 adjacent outer wall 122*a* in the manner described in connection with the previous embodiments to provide an airtight seal between supply conduit 12 and wall 122.

It will be understood that various modifications may be made to the embodiments disclosed herein. For example, the sealing device may assume other configurations which are capable of providing an adequate seal and radial and axial adjustment of the sprinkler head and supply conduit. Further, the order of the method steps may be changed or varied slightly. For example, the sealing device may be positioned about the supply conduit prior to inserting the supply conduit through the opening in the cold environment. Therefore, the above description should not be construed as limiting, but merely as exemplifications of preferred embodiments. Those skilled in the art will envision other modifications within the scope and spirit of the claims appended hereto.

What is claimed is:

1. A method of installing a dry sprinkler installation in a cold environment, the method comprising the following steps;

providing a dry sprinkler including a supply conduit having a first end adapted to communicate with a fluid supply main and a second end supporting a sprinkler head;

positioning the supply conduit through an opening in a wall defining the cold environment such that the sprinkler head is supported within the cold environment;

positioning a flexible annular sealing device about the supply conduit adjacent an external surface of the cold environment;

securing a first end of the annular sealing device to the supply conduit; and securing a second end of the annular sealing device to the exterior surface of the cold environment.

2. A method according to claim 1, wherein the flexible annular sealing device is formed from rubber.

3. A method according to claim 2, wherein the flexible annular sealing device is molded from EPDM rubber.

4. A method according to claim 1, wherein the annular sealing device includes a body portion and a radial flange formed on the second end thereof.

5. A method according to claim 4, wherein the body portion is substantially conical and defines a throughbore extending from the first end of the annular sealing device to a second end of the annular sealing device.

6. A method according to claim 5, wherein the throughbore at the second end of the annular sealing device has an inside diameter which is greater than the inside diameter of the throughbore at the first end of the annular sealing device.

7. A method according to claim 4, wherein the step of securing the second end of the annular sealing device to the exterior surface of the cold environment includes applying an adhesive to the radial flange and/or the exterior surface of the cold environment.

8. A method according to claim 7, wherein the step of securing the first end of the annular sealing device to the supply conduit includes the step of applying at least one flexible tie about second end of the annular sealing device and about the supply conduit.

9. A method according to claim 7, wherein the adhesive is an ethyl cyanoacrylate adhesive.

10. A method according to claim 1, wherein the cold environment is a freezer.

11. A method of installing a dry sprinkler installation in a cold environment, the method comprising the following steps;

providing a dry sprinkler including a supply conduit having a first end adapted to communicate with a fluid supply main and a second end supporting a sprinkler head;

positioning the supply conduit through an opening in a wall defining the cold environment such that the sprinkler head is supported within a heated environment;

positioning a flexible annular sealing device about the supply conduit adjacent a surface of the cold environment;

securing a first end of the annular sealing device to the supply conduit; and securing a second end of the annular sealing device to exterior surface of the cold environment.

* * * * *